June 16, 1942.　　　H. A. NOYES　　　2,286,225
FREEZING PROCESS
Filed Nov. 16, 1936
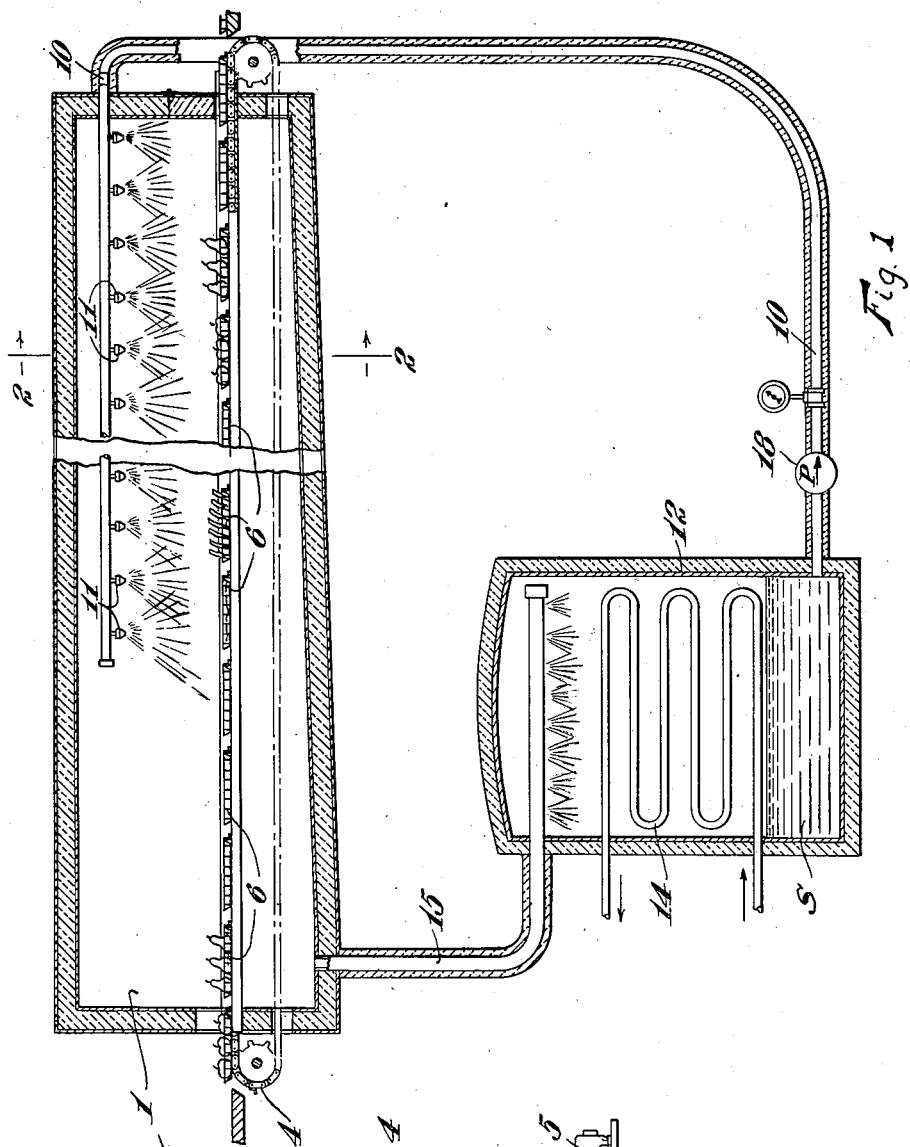
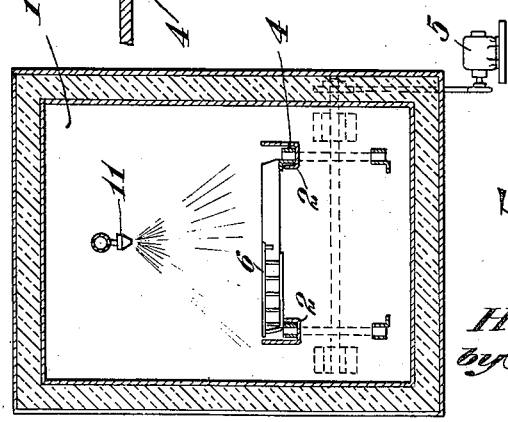
Inventor
Harry A. Noyes
by Robert Cushman Woodbury
attys.

Patented June 16, 1942

2,286,225

UNITED STATES PATENT OFFICE 2,286,225

FREEZING PROCESS

Harry A. Noyes, Waban, Mass., assignor, by mesne assignments, to Z Pack Corporation, Jersey City, N. J., a corporation of Delaware Application November 16, 1936, Serial No. 110,964

2 Claims. (Cl. 99—198)

This invention relates to a process of freezing comestibles and to a refrigerant particularly suitable for use therein.

The prevailing commercial processes for freezing comestibles may be divided into four general classes, viz., the cold pack procedure, wherein the material to be frozen is mixed with dry sugar or with a liquid, such as a syrup, gel or other normally fluid composition, and placed in a refrigerated space; air freezing, wherein refrigerated air is the freezing agent and comes either in direct contact with the product to be frozen or in contact with a container enclosing the product; the plate-contact process, wherein the product, either packed or unpacked, is subjected to the heat-dissipating action of one or more heat conductive contact members associated with a refrigerant; and the spray freezing procedure, wherein the product is subjected to the action of a brine at a temperature substantially lower than its freezing point.

From a commercial standpoint the cold pack procedure is objectionable in that it is not only time-consuming, but also embodies the use of a packing medium which has an appreciable extractive and/or solvent action on the product during the time required to effect a thorough freezing, and consequently there is a substantial chemical and physical change in the characteristics of the product. This is particularly true in the case of cut fruits, vegetables, etc., as the liquid medium, prior to freezing, not only exhibits an osmotic action which causes a serious shrinkage in the volume, for example, of solid fruit by withdrawing some of the juices thereof, but also reacts with the juices of the product.

Air freezing processes are objectionable in that they are also time-consuming, and furthermore not only dehydrate the product being frozen causing reduced yields, toughening the product and shortening the period during which the product can be stored, but also permit oxidation which results in loss of color and flavor, and an alteration of the structural characteristics of the product.

The plate contact process likewise requires considerable time in order to effect a thorough freezing and, furthermore, is not generally applicable to the more delicate products, such as strawberries, cut pineapple and like juicy fruits and vegetables, due to the fact that the intimate contact between the product and the refrigerated plate necessary for a satisfactory quick freezing can not be obtained without heavy pressure and consequent physical injury to such products if frozen without added material to fill interstitial spaces. Moreover, a quick freezing of such products when packed is prevented by the presence of interstitial spaces which are filled with air or other gas.

The spray-freezing process as heretofore practiced, although appreciably shortening the time required thoroughly to freeze the product, is nevertheless objectionable in that the freezing medium consists essentially of a brine solution (with or without flavoring or seasoning ingredients) which possesses a recognized physical and chemical activity and in the concentrations required for low temperature freezing imparts a salty and bitter taste to the product. The rate of penetration of a brine solution is comparatively rapid, and its electrolytic properties, accompanied by relatively high solubilities and the activity of its metallic component, often produce reactions which are inimical to, if not destructive of, the chemical constitution of comestibles.

The principal objects of this invention are to overcome the aforementioned deficiencies inherent in the prior processes and to provide a process which is capable, not only of rapidly and efficiently freezing juice-containing comestibles, but also of substantially maintaining in chemically and physically unaltered condition the original integrity and individuality of the comestible, that is, this process does not shrink the product by withdrawing juices by osmosis, does not produce a salty or bitter taste, reduces the rate of dehydration and increases the length of time that the product can be stored without dehydration or other change.

Other objects are to provide a relatively inexpensive refrigerant which possesses sufficient fluidity at temperatures substantially lower than the freezing point of comestibles to permit its being sprayed or otherwise being brought into direct contact with the product to be frozen, and which is substantially non-reactive with comestibles, at least in the sense that it does not result in a detrimental chemical or physical alteration of their constituents; and to provide a reliable and efficient process of preparing the same.

Further objects will be apparent from a consideration of the following description and the accompanying drawing which illustrates one type of apparatus suitable for carrying out the present invention.

In the drawing:

Fig. 1 is a diagrammatic sectional view of the apparatus; and

Fig. 2 is an enlarged section on the line 2—2 of Fig. 1.

I have found that a refrigerant consisting essentially of an aqueous solution of that class of organic compounds termed "sugars" not only possesses all the advantageous features of refrigerants now or heretofore used, but also is compatible with the constitution of fruits, vegetables and other types of comestibles at temperatures at or below their freezing points. Accordingly, such a refrigerant, either in the form of a spray, a dense fog or a stream, may be brought into direct contact with the comestible to be frozen, without danger of effecting an undesirable chemical or physical alteration of its constituents.

The temperature of the solution may be varied throughout a range from 2° F. to 25° F., depending upon the freezing temperature of the product under treatment and the particular type or types of sugar in solution. It is to be understood that the present invention is not limited to the use of any one sugar or any mixtures of sugars so long as it contains levulose in an amount which is at least about 50% of the sugar content present, nor to the concentration of a sugar or mixture of sugars in the refrigeration solution so long as rapid flow and draining is insured. Although sugars of the class exemplified by sucrose, dextrose and levulose, have been found most economical and serviceable, I contemplate the use of various other types such, for example, as maltose, mannose, rhamnose, xylose and trehalose, as well as the heptoses and octoses.

There are not only preferable concentrations of sugar solutions, but also specific sugars and mixtures of sugars that are better adapted than others to the freezing of particular types of comestibles. Mixtures of hexose sugars in solution and certain specific sugars such, for example, as levulose, produce a relatively greater lowering of the freezing point of water than do other types and accordingly permit a wider difference between the freezing temperatures of the substance to be frozen and the temperature of the refrigerant used.

A further advantage inherent in the use of a refrigerant prepared in accordance with the present invention resides in the fact that sugar solutions are non-electrolytes and in any concentrations suitable for use as freezing agents are quite stable and may be maintained in use without appreciable danger of the development of micro-organic growths. In fact, the temperatures encountered in freezing operations suppress the development of micro-organic life and tend to eliminate troubles ordinarily associated with fermentation.

Comestibles frozen in accordance with the present invention constitute a new and distinctive article of commerce, having characteristics not possessed by comestibles treated in accordance with processes heretofore used. In freezing comestibles in the manner herein described, the viscosity of the liquid film contiguous to the substance to be frozen is substantially reduced due to the absorption of heat therefrom, and as this film is somewhat diluted by liquids present on the surface of the comestible, there results a quick freezing phenomena which includes a slow physio-chemical action of the sugar on the frozen surfaces of each individual unit under treatment. This is particularly true in the case of fruits, berries and vegetables copable of exuding liquids containing pectin, the presence of which tends to promote a gel formation, especially at low temperatures.

As the freezing points of most of the well known fruits and vegetables are above 28° F., a fluid sugar solution at a temperature as high as about 25° F. may be used. A sugar solution having a viscosity not exceeding 70 centipoises at the temperature used and a concentration such that it will not separate out a solid phase at such temperature (e. g., 2 mols), has been found to be generally satisfactory for commercial use. The difference in temperature between the freezing point of the comestible and the refrigerant may be varied in accordance with the capacity of the latter to absorb the available heat of the former, and as it is usually desirable to effect a "quick-freeze," it is advantageous to precool the comestible before subjecting it to a freezing operation wherein the temperature of the refrigerant is of the order of 25° F., particularly where the size of the individual units is relatively large.

A preferred refrigerant, having a general utility in freezing various types of comestibles, consists of an aqueous sugar solution having a high levulose content relative to the total solids content. Such a refrigerant may be prepared on a commercial scale in various ways, as, for example, by the inversion of sucrose and the subsequent treatment of the invert sugar to eliminate at least a part of the dextrose content, as set forth in the following procedure presently to be described.

*The paste method.*—An invert sugar paste is diluted with sufficient water to put all the sugar solids into solution, for example, an ordinary invert sugar paste obtained in the open market, containing 38% each of dextrose and levulose and a small percentage of uninverted sucrose, is diluted to about 50% to 55% solids at ordinary temperatures (60° to 70° F.). This solution is then cooled to a temperature of the order of 35° F. or lower and a further quantity of the invert sugar paste is then added and thoroughly mixed therewith. A part of the dextrose then settles out readily and may be removed in any suitable manner as by settling or centrifuging. The remaining solution contains a relatively higher levulose content than the original solution, and since the precipitated dextrose takes with it a certain amount of water, the removal of dextrose is not accompanied by any material dilution of the solution. If desired, the levulose content of the resulting solution may be further increased by a further cooling of the resulting solution, which is accompanied by the consequent separation of dextrose therefrom, and this solution may be further concentrated by the addition of more paste, whereupon there is a corresponding increase in levulose concentration and an additional dextrose precipitation which may be removed as previously described. By repeating the process, that is, further cooling of the solution, adding more paste, and removing the dextrose crystals, the concentration of levulose in the remaining solution may be built up until it reaches 75% or more of the soluble solids in solution.

It is not necessary to start with a regular invert sugar paste in carrying out the above procedure, as other mixtures of levulose and dextrose than those having a substantially 1:1 ratio may be used.

*The pressure method.*—An invert sugar paste is first diluted to a point where it is substantially entirely in liquid phase at normal temperatures and is then cooled under pressure, the greater the pressure the greater the solubility of the sugars in the solution. After lowering the temperature sufficiently, the pressure is released, whereupon part of the dextrose precipitates out as crystals which float to the top. The precipitated dextrose may then be segregated from the remaining solution in any suitable manner and, if desired, the proportion of levulose in the resulting solution may be increased by the further addition of invert sugar and/or subsequent treatment at lower temperatures and greater pressures.

A preferable procedure embodies a continuously circulating system which may be carried on in the apparatus herein shown, where the release of the pressure takes place on emission from the spray nozzles 11.

*The added solute method.*—An invert sugar solution is treated with ethyl alcohol, glycerin, or other compound having a higher solubility in water than the sugars present, and with careful manipulation, part of the dextrose separates out, the separation being augmented by cooling the mixture with full allowance for the solubilities of all the constituents present. In carrying out this procedure the original solution should not be too dilute but, on the other hand, the presence of some undissolved sugars is not ordinarily disadvantageous as any undissolved particles have a tendency to promote the subsequent crystallization of the dextrose. A particular advantage of this method is that a product is obtained which is not only high in levulose but which also contains an added material which imparts certain advantages for spray freezing.

*The cryohydrate-ice method.*—An invert sugar paste is first diluted to the point where it contains approximately 50% sugar solids and 50% water. This solution is then cooled to a relatively low temperature, sufficient to separate out part of the dextrose compounds. These crystals may have, depending upon solute concentration, an exceptionally high water content, being generally about two parts water to one part dextrose by weight—equivalent to 20 mols of water to one of dextrose. As the above solution contained 25% dextrose, 25% levulose, and 50% water, the precipitation of the dextrose is a cryohydrate separation—that is, the precipitate in part contains the same ratio of dextrose to water as the dextrose-water content in the original solution. The original solution ordinarily should not contain over 57% sugar solids, as such a solution, on cooling, tends to supercool and supersaturate and the dextrose either will not come out or will come out in a form difficult to separate, and in any event will not come out through use of cryohydrate-ice relationships. Where the sugar content of the solution is about 55%, the cooling temperature may be advantageously lowered to around 0° F.; if 50%, to around 5° to 8° F.; if 45%, to around 10° to 15° F., etc.,—as a freezing point is of course more greatly depressed by greater amounts of solute.

The resulting solution prepared in accordance with any of the foregoing procedures contains a relatively high levulose content which may vary from 55% to 95% or more of the total solids content, and such sugar solutions may be subjected to temperatures well below 25° F. without danger of separation of any of their constituents and without loss of the desired degree of fluidity necessary for spray freezing.

Referring to the drawing, an elongate, well insulated freezing chamber 1 is provided with a pair of spaced longitudinally extending rails 2 (Fig. 2) which support or guide a conveyor 4 which extends through an opening (entrance) at one end of the chamber, along the entire length to a corresponding opening (exit) at the opposite end of the chamber. The conveyor 4 is driven by a motor 5 provided with suitable controls by means of which the rate of travel of the conveyor may be varied as desired. The conveyor 4 is designed to carry a plurality of perforated trays or receptacles 6 adapted to hold the comestibles under treatment.

A line 10 supplying a refrigerant S extends longitudinally of the chamber from its entrance end to a point beyond the central zone, thus providing a draining zone at the exit end of the chamber, and a series of spaced spray nozzles 11 extends along the line 10, as shown in Fig. 1. The line 10 is connected with a supply reservoir, here shown as a heat exchanger or cooling tank 12, provided with refrigerating coils or pipes 14. The refrigerant drained from the freezing chamber 1 is conducted back to the tank 12 by the pipe line 15 and is recooled by flowing over the coils 14. A motor driven pump 18, connected in the line 10, is operative to maintain the flow of refrigerant S from the tank 12 to the freezing chamber at the desired rate, and suitable means (not shown) are provided to effect a flow of brine or the like through the cooling coils 14 to maintain the refrigerant S in the tank 12 at the desired temperature.

For either batch or continuous operation the comestibles to be frozen are placed in the receptacles 6 so that as much of the surface of each unit is exposed as practical. With the sugar solution S at the proper temperature and the pump 18 set to maintain the proper flow through the pipe 10 and spray nozzles 11, the receptacles containing the comestibles to be frozen are introduced into the freezing chamber 1. In continuous operation the conveyor 4 travels through the chamber at a rate low enough to expose the comestibles to the action of the freezing spray for a period sufficient thoroughly to freeze them to the extent desired, after which they are carried through the draining zone and then discharged at the unloading platform ready for packing, storage, further heat extraction if desired, or other suitable disposition. In batch operations the procedure is substantially the same except that the conveyor 4 remains stationary during the period in which the comestibles are subjected to the action of the freezing spray. In either case the surface of each individual unit is impinged upon by the refrigerated liquid discharged from the nozzles 11 and is completely enveloped by a film of the liquid which flows off at once and is rapidly replaced by fresh cold refrigerant, and as a result the surface of each individual unit is hardened almost instantly. When thus frozen the units retain their individuality and their constituents remain substantially unaltered either by loss of juices or moisture.

The adaptability of my process for freezing various types of comestibles is shown by the following examples representative of different types of fruits and vegetables:

*Strawberries and the like.*—Berries as received from the fields or from the avenues of commerce are subjected to the usual preparatory operations—capping, washing, etc.—after which they are sorted to separate out culls and spoiled fruit. The prepared berries are then placed in a suitable receptacle, such as a perforated tray or other container, as illustrated in the accompanying drawing, and, if desired, the berries may be precooled to a temperature of the order of 35° F. prior to subjecting them to freezing. For both batch and continuous operation the berries preferably are arranged in relatively thin layers of uniform thickness, although layers several inches thick may be satisfactorily frozen, especially if the refrigerant is directed from several directions and the berries do not pack so tightly as to retard the flow of the refrigerant. When thus arranged the trays are introduced into the freezing chamber where they are subjected to the action of a stream, spray or fog of the refrigerant.

The preferred refrigerant consists of a sugar solution having a concentration such that it will not separate out a solid phase above 15° F., and to this end either an invert sugar solution, a high levulose sugar solution, or a solution of other type sugar capable of maintaining its fluidity at 15° F. without separation of any of its constituents, may be used.

In case the berries have not been precooled, the sugar solution circulating through the system is maintained at a temperature approximately 17° F. and the time of treatment may be from twelve to eighteen minutes, depending on the size of the berries and the various operating factors of the particular type of freezing apparatus used. If the berries have been precooled to a temperature a few degrees above their freezing point, a sucrose solution of about 2 mols concentration may be used and, if desired, the temperature of the sugar solution may be increased to about 25° F. It is to be understood that the temperature and volume of the refrigerant circulated may be increased or decreased as efficient operation calls for.

Products thus frozen have better keeping qualities than products which are ordinarily packed and stored with air or other gas in the interstitial spaces and which are frozen at a relatively slow rate during the initial portion of the storage period, due to the protective action of the sugar in retarding dehydration and, in the case of most fruits, the sealing effect of the gel layer formed at or near the surface. Moreover, in the case of fruits, which, under commercial conditions of harvest and from practical considerations, can not all be of the same degree of ripeness, the sugar has the effect of improving the flavor of the pack by adding to the less ripe portion the constituents which would occur in normal ripening. It is also recognized that additions of such small portions of sugar as are normally taken up by fruit treated in accordance with the present invention are advantageous in bringing out and intensifying the natural flavor of the fruit.

Another important advantage of the sugar is its effect in retaining the natural color and surface characteristics of the products treated, even in the frozen condition. Products frozen without such protective treatment have a hard icy surface prior to defrosting and are not pleasant to eat, whereas the same type products frozen by my process appear bright, fresh and moist, and have excellent eating qualities even in their frozen condition. A further important advantage from the view point of the packer resides in the fact that the frozen units or pieces retain their individuality which permits sizing, sorting, grading, and packing after freezing in ways not possible with products frozen by most other procedures.

*Corn on the cob.*—Corn, husked and desilked in accordance with any of the customary procedures, preferably is supported in an upright position as, for example, by spikes or pegs carried by a tray or conveyor and is subjected either to the spray freezing process above described, or to the action of a stream of the refrigerant. In either case, the refrigerant may consist of a sugar solution preferably having a viscosity of the order of 58 centipoises at 14° F. and may be prepared by any of the procedures herein described.

*Lima beans and seed products.*—Lima beans and seed products may likewise be frozen by my process. The beans may be washed, sorted and blanched in the usual manner and are then preferably treated in an elongate freezing chamber having sliding perforated trays or on a perforated belt passing through a stream, spray or fog of the refrigerant. As this particular type of product does not generally require added sweetness, it is desirable to freeze it with as low temperature sugar solution as is commercially practical to work, and accordingly a sugar solution (8 mols) having a high levulose content is recommended. In order to effect a quick, thorough freezing, the depth or thickness of the layer of beans should be such as to permit the ready access of a spray or fog of the refrigerant to the surfaces of the individual beans. After having been subjected to the freezing treatment for a period sufficient to effect the desired freezing, the beans are drained and freed of excess sugar solution adhering to their surface, after which they may be packed in the usual manner.

It should be noted that lima beans are illustrative of a type of comestible which may desiccate at its surface with attendant wrinkling of the outer skin-like layers and change of color, and which undergoes chemical changes often causing the outer layer of the bean to become swollen. Such changes often occur in the vining, threshing and sorting operations, and when such products are spray frozen with a brine solution, there is an appreciable penetration of the brine which produces a product having an objectionable salt content—in contradistinction to products frozen in accordance with the present invention which produces a plump, attractive and tasty bean wherein there is no substantial penetration of the sugar solution.

*Cut fruits, etc.*—The herein described process is particularly adapted for freezing cut fruits and vegetables generally, and sliced apple has been selected as illustrative of this class of comestibles.

Sliced apple, prepared in the usual manner, is placed in trays or other suitable holders and the loaded trays are then transferred to the freezing chamber where they are subjected to the action of the refrigerant which is preferably in the form of a fine spray. The preferred refrigerant consists of a sugar solution having a concentration of at least 8 mols, that is to say, 8 molecular weights of sugar in 1,000 cc. of water, and a viscosity less than 59 centipoises, this solution being capable of retaining its fluidity at temperatures of the order of 2° F. In order to effect a quick freezing, the refrigerant circulating through the system preferably is maintained at a relatively low temperature, for example, 2° to 5° F. During the freezing operation the sugar solution comes in direct contact with the moist surface film which contains fruit acids, pectin, etc., and a physio-chemical action takes place, resulting in the formation of what appears to be a gel film which envelops the entire unit. The surface freezes almost instantly and thus provides an effective seal against oxidation and dehydration. The resulting product is characterized by the preservation of its original constituents in unaltered condition, and although there may be a very slight increase in its total sugar content, due to the enveloping gel film, the extraneous sugar therein is relatively small.

While I have shown and described the application of my process to different types of comestibles and various ways of preparing a suitable refrigerant, it is to be understood that this disclosure is for the purpose of illustration only and that various changes and modifications may be made without departing from the spirit and scope of the invention as set forth in the appended claims.

I claim:

1. The process of quick freezing fresh fruit, which consists in circulating a refrigerant sugar solution having a concentration not greater than 8 mols, a sugar content of which at least about 50% is levulose, and a viscosity of the order of 70 centipoises at the temperature of operation, by directing said solution alternately over cooling means to maintain the refrigerant between 2° F. and 25° F. and over the fresh fruit until the said product is substantially frozen, said refrigerant solution being applied to the product as a spray and having its physical properties thus selected and maintained as to composition, concentration, viscosity and temperature so that the solution rapidly flows over and drains from the surface of the product and is therefore rapidly and continuously replaced by fresh solution, whereby the surface layers of the product are frozen almost instantly and before the osmotic effect of the sugar solution on said surfaces has withdrawn juice from the said product to an appreciable extent.

2. A process of quick freezing fresh fruits in loose formation, which comprises flowing a refrigerant sugar solution, of which at least substantially half of the total sugar content is levulose, alternately over cooling means to maintain said solution at a quick freezing temperature of between 2° F. and 25° F. and over the product to be frozen until the said product is substantially frozen, the physical properties of said solution being such that it flows rapidly over said cooling means and over the product and drains rapidly from the surfaces of the said product so as to be continuously replaced by fresh cold solution, with the result that the surface layers of said product are hard frozen almost instantly and before the osmotic effect of the sugar solution on said surfaces has withdrawn juice from the product being frozen to an appreciable extent, said quick frozen product acquiring a protective film of the refrigerant solution which brightens its appearance and protects the product against dehydration during subsequent storage in the warehouse, said refrigerant solution having a concentration not greater than 8 mols and a viscosity of the order of 70 centipoises at temperatures between 2° F. and 25° F.

HARRY A. NOYES.